(12) United States Patent
Heren et al.

(10) Patent No.: US 9,038,378 B2
(45) Date of Patent: May 26, 2015

(54) HYDROSTATIC TRANSMISSION APPARATUS MAKING IMPROVED BRAKING POSSIBLE

(75) Inventors: Jean Heren, Margny les Compiègne (FR); Julien Viard, Pontpoint (FR)

(73) Assignee: POCLAIN HYDRAULICS INDUSTRIES, Verberie (FR)

( * ) Notice: Subject to any disclaimer, the term of this patent is extended or adjusted under 35 U.S.C. 154(b) by 533 days.

(21) Appl. No.: 13/503,207

(22) PCT Filed: Oct. 20, 2010

(86) PCT No.: PCT/FR2010/052228
§ 371 (c)(1),
(2), (4) Date: Jun. 28, 2012

(87) PCT Pub. No.: WO2011/048327
PCT Pub. Date: Apr. 28, 2011

(65) Prior Publication Data
US 2012/0255294 A1      Oct. 11, 2012

(30) Foreign Application Priority Data

Oct. 22, 2009   (FR) ..................... 09 57410

(51) Int. Cl.
| F16D 31/02 | (2006.01) |
| F16H 61/448 | (2010.01) |
| F16H 61/4052 | (2010.01) |
| F16H 61/4157 | (2010.01) |

(52) U.S. Cl.
CPC ......... *F16H 61/448* (2013.01); *F16H 61/4052* (2013.01); *F16H 61/4157* (2013.01)

(58) Field of Classification Search
CPC ......... F16H 39/02; F16H 39/06; F16H 61/38; F16H 61/4052; F16H 61/4157; F16H 61/448
USPC .......................... 60/468, 483, 487, 488, 489
See application file for complete search history.

(56) References Cited

U.S. PATENT DOCUMENTS

| 3,768,263 A | 10/1973 | Olson et al. |
| 2010/0205954 A1 | 8/2010 | Heren |

FOREIGN PATENT DOCUMENTS

| EP | 0 244 543 A1 | 11/1987 |
| FR | 2 891 593 A1 | 4/2007 |
| FR | 2 907 528 A1 | 4/2008 |
| WO | 2011/048327 A1 | 4/2011 |

OTHER PUBLICATIONS

International Search Report; mailed Jan. 24, 2011 PCT/FR2010/052228.
Written Opinion of the International Search Authority PCT-FR2010-052228 (Machine Translation).

*Primary Examiner* — Michael Leslie
(74) *Attorney, Agent, or Firm* — Ladas & Parry LLP

(57) ABSTRACT

Hydrostatic transmission apparatus having an elementary motor with a feed enclosure and a discharge enclosure; a displacement selector suitable for taking up a bypass position, in which the feed and discharge enclosures are interconnected via a bypass link; and constriction means for constricting said bypass link. When the selector is in the bypass position, the constriction means can be activated to restrict the flow of fluid through the bypass link when the discharge pressure in the discharge enclosure exceeds a constriction threshold, said threshold being a function of a control pressure prevailing in a control chamber.

22 Claims, 11 Drawing Sheets

HYDROSTATIC TRANSMISSION APPARATUS MAKING IMPROVED BRAKING POSSIBLE

The invention relates to hydrostatic transmission apparatus comprising at least a first elementary motor fed via a feed enclosure and from which fluid is discharged via a discharge enclosure, and a displacement selector, the displacement selector being suitable for taking up a bypass position, in which said feed enclosure is put into communication with said discharge enclosure via a bypass link, the apparatus further comprising constriction means for constricting said bypass link.

When said elementary motor is incorporated in a hydraulic circuit, the feed and discharge enclosures are enclosures through which the fluid respectively feeding and being discharged from the first elementary motor passes, while the elementary motor is generating drive torque.

When the elementary motor is bypassed, it does not deliver any drive torque. Conversely, when the constriction means are activated, if the motor is being driven in rotation, it exerts braking torque. For example, when the apparatus is mounted on a vehicle and when the first elementary motor of the apparatus is coupled to a wheel, and, in a braking situation, the constriction means are activated, then the elementary motor exerts braking torque on the wheel and thus contributes to braking the vehicle.

In general, the invention relates to hydrostatic transmission apparatus including a first elementary motor, independently of the load to which the motor is coupled, be it a movement member such as wheel, a tool, or some other member.

Various solutions have already been proposed for implementing a constriction on the bypass link and for controlling activation of said constriction.

Document FR 2 907 528 thus presents apparatus in which a link selector makes it possible to interconnect the feed and discharge enclosures of a motor via a bypass link. The bypass link is provided with constriction means, namely a pressure reducer controlled by the downstream pressure. The regulation thus takes place in such a manner as to balance the downstream pressure and a force exerted by a spring of variable pressure rating, where the downstream pressure is the pressure in a feed enclosure of the motor.

The drawback of that apparatus is that it does not make it possible to modulate braking, because the pressure rating of the spring is difficult to modify. In addition, if the pressure rating of the spring is too low, pressure loss that is too high is established in the bypass link, and cavitation can occur therein.

An object of the invention is thus to propose apparatus as presented in the introduction but that is easier to control than the above-mentioned apparatus, in particular with it being possible to modify the braking torque that can be delivered by the motor in a braking situation.

This object is achieved by means of the fact that, when the selector is in the bypass position, the constriction means are suitable for being activated to restrict the flow of fluid through the bypass link when a discharge pressure prevailing in the discharge enclosure exceeds a constriction threshold, said threshold being a function of a control pressure prevailing in a control chamber, and the constriction means are suitable for being deactivated to enable fluid to flow substantially freely through the bypass link when the discharge pressure is less than said constriction threshold.

When hydraulic equipment or a vehicle needs to brake, i.e. needs to be slowed down, various actions can be taken, such actions generally leading to modifying the pressures normally established in the hydraulic circuits, and, in particular, leading to causing increases in pressure, and in particular to generating back pressures in the ducts that serve for discharge purposes.

Advantageously, the hydrostatic transmission apparatus of the invention is suitable for making use of the increases in pressure that occurs during braking of the vehicle or of the machine on which the apparatus is mounted by using said increases to trigger hydrostatic braking, providing the rotor of the elementary motor is driven at the time of the braking.

Since activation of the constriction means depends on the control pressure prevailing in the control chamber, said activation is easy to modulate or to control by acting on the value of the control pressure.

The "constriction threshold" designates a pressure above which the constriction means are activated and induce a constriction.

The term "displacement selector" is used to mean members and in particular fluid distribution members that make it possible to change the displacement (cylinder capacity) of the apparatus from one value to another. In particular, the apparatus may, in addition to the first elementary motor, further comprise one or more other elementary motors (e.g. in a circuit of the Twin-Lock type). The displacement selector may act to bypass one or more of the elementary motors and thus to cause the displacement of the apparatus to vary.

Advantageously, the control chamber is a chamber of the displacement selector.

A secondary object of the invention is also to control the braking torque delivered by the motor, e.g. by assigning a constant value to it. It is particularly advantageous to make the torque independent of the flow rate of fluid through the first elementary motor, because the desired braking torque does not generally depend on that flow rate.

This object is achieved by the fact that, in one embodiment, when they are activated, said constriction means are suitable for regulating the feed pressure of the first motor to a balancing pressure that is a function of the control pressure, and more particularly to a balancing pressure that is substantially proportional to the control pressure.

It can be understood that, in this embodiment, the balancing pressure is independent of the flow rate of fluid through the motor.

The feed pressure of the first motor can be regulated by various means, and in particular by imparting a suitable structure to the constriction means of the bypass link.

Thus, in one embodiment, the constriction means comprise:

a pressure-balancing portion having opposite surfaces facing in opposite directions opening into respective chambers, in which the pressures are respectively the control pressure and the feed pressure; and a head-loss portion suitable for causing the through section between the feed enclosure and the discharge enclosure of the first elementary motor to vary; and in addition with the movements of the balancing portion controlling the movements of the head-loss portion. For this purpose in general, these two portions are fastened rigidly to each other or are two portions of the same part.

The balancing portion is exposed to the control pressure on a first surface and to the feed pressure on a second surface, the two surfaces being, for example, parallel but facing in opposite directions. In such a configuration, the balancing pressure is established at a pressure equal to the product of the control pressure multiplied by the ratio of the area of the first surface to the area of the second surface. Said balancing pressure is thus proportional to the control pressure.

The feed pressure is regulated to the balancing pressure by the head-loss portion, which is arranged to enable fluid to be discharged from the feed enclosure as soon as the balancing portion moves due to the feed pressure tending to exceed the balancing pressure, and otherwise to enable fluid to be brought into the feed enclosure.

In a particular embodiment, when they are activated, the constriction means make it possible to vary a through section of the bypass link, in such a manner that an increase in the feed pressure of the first motor tends to cause a decrease in said through section.

In one embodiment, the apparatus further comprises a fluid distributor, and the selector is disposed inside the distributor on an axis of rotation of the first elementary motor. Thus, the apparatus can be implemented in a small volume.

In one embodiment, the selector includes a moving part having an outside surface that constitutes a wall of the control chamber, the pressure that is exerted on said surface inside the control chamber being suitable for causing the moving part to move, thereby causing the displacement to change. For example, this moving part may be a slide mounted to move in translation in a bore.

Advantageously, the control chamber thus combines the functions of control chamber for activating and controlling constriction means, and of control chamber for selecting displacement. This results in a saving in terms of components in the apparatus.

In one embodiment, the selector has a body, and the constriction means are disposed in the body of the selector. The term "body" is used to designate a part or a set of parts inside which the functions in question are performed; for example, for this selector, the function of displacement selection. For example, a body may be implemented by one or more casing portions, and optionally by one or more closure parts such as covers.

The above-mentioned embodiment is advantageously highly integrated, with the displacement selector also performing the function of constricting the bypass link. However, some or indeed all of the constriction means may be disposed outside the body of the selector.

In one embodiment, the selector has a body, and a slide that is disposed in a bore in the selector body; and, inside the control chamber for controlling the constriction means, the control pressure is applied on the slide, making it possible to cause said slide to go into the bypass position or not to cause said slide to go into said bypass position. The slide sliding into the bypass position causes a change in the displacement of the apparatus, in particular due to the elementary motor thus being placed in the bypass position, in which it does not deliver any drive torque and has zero displacement.

In one embodiment, the apparatus further comprises a main pump, and the body of the selector is provided with at least three grooves;

the first groove and the second groove respectively form at least part of the discharge enclosure and at least part of the feed enclosure of the first elementary motor;

the first groove is suitable for being connected to a fluid feed or fluid discharge circuit, e.g. to a main orifice of the main pump;

the second groove is suitable for being connected to the first groove or to the third groove respectively when the slide of the selector is in a first position and when said slide is in a second position, the first position thus constituting the bypass position;

the third groove is suitable for being connected to a fluid feed or fluid discharge circuit, e.g. to a main orifice of the main pump;

the constriction means comprise a moving constriction part; and in the bypass position:

when the constriction part is in a first position, the second groove is put into communication with the first groove substantially without any constriction; and when the constriction part is in at least one other position, the second groove is put into communication with the first groove and the constriction part constricts a through passage between the first groove and the second groove.

An example of a fluid discharge circuit is a pressure-free reservoir, towards which the fluid is discharged in general via a pressure limiter, such as a rated valve.

Depending on the position taken up by the constriction part, the constriction applied to the through passage between the first groove and the second groove is greater or lesser.

In one embodiment, the apparatus further comprises a second elementary motor having a discharge enclosure and a feed enclosure formed respectively, and at least in part, by the first groove and by the third groove. The two elementary motors can thus be operated in two different cylinder capacities, depending on whether the bypass link is open or otherwise.

In one embodiment, the apparatus further comprises a second elementary motor having a discharge enclosure formed at least in part by the first groove, and a feed enclosure, which feed enclosure is suitable for being put into communication with a fluid feed or fluid discharge circuit by additional displacement selection means. The additional displacement selection means may optionally be disposed in the selector. In particular, they may be a second displacement selector of the apparatus, distinct from the first selector.

In one embodiment, the two elementary motors are part of the same hydraulic motor and are suitable for driving a common outlet member of said hydraulic motor. In general, in many cases the apparatus may be arranged entirely inside a common hydraulic motor provided that the various elementary motors incorporated into the apparatus can be incorporated into said common motor. The apparatus is then incorporated into the casing of the common motor, whereby it is advantageously particularly compact.

Thus, in one embodiment, the constriction part:
is urged in opposite directions by the control pressure and by the feed pressure;
moves in a first direction and reduces the section of said through passage when the feed pressure is tending to increase above the balancing pressure; and
otherwise moves in a second direction and increases said section of said through passage;

whereby said constriction part makes it possible to regulate the feed pressure to the balancing pressure.

In one embodiment, the constriction part comprises a slidably mounted bushing disposed in the bore, said bushing making it possible, as a function of its position relative to the grooves, to close off in part said through passage between the first and the second groove. The bushing is characterized, in particular by its (at least partially) cylindrical outside surface, suitable for being put into substantially leaktight contact with the inside surface of the bore in which it slides.

In one embodiment, the bushing and the slide have concentric surfaces and are disposed on an axis of the bore of the selector. This embodiment makes it possible to manufacture the bushing and the selector at low cost, due to the simplicity of machining or of turning the cylindrical surfaces.

In one embodiment, the apparatus further comprises means for causing the control pressure to vary. These means may be designed to cause the control pressure to vary continuously, or in on/off mode. In one embodiment, these means comprise an activation valve interposed on the link between the auxiliary source and the control chamber, this valve having an activation position in which it interconnects said pump and said chamber, and a de-activation position in which said chamber is put into communication with a pressure-free reservoir.

In one embodiment, the control chamber is suitable for being connected to an auxiliary source of fluid under pressure, such as a booster pump of the apparatus. Since the booster pump is thus itself connected to the control chamber, and thus acts on the displacement selection and on the regulation of the constriction in the bypass link, it follows that the pressure in the control chamber and in certain enclosures is related to the boost pressure. Therefore, this configuration ensures that the pressure in the control chamber and in the enclosures is sufficient to avoid cavitation.

The invention can be well understood and its advantages appear more clearly on reading the following detailed description of embodiments shown by way of non-limiting example. The description refers to the accompanying drawings, in which:

FIG. 1 shows a first embodiment of hydrostatic transmission apparatus of the invention.

Figure 1:
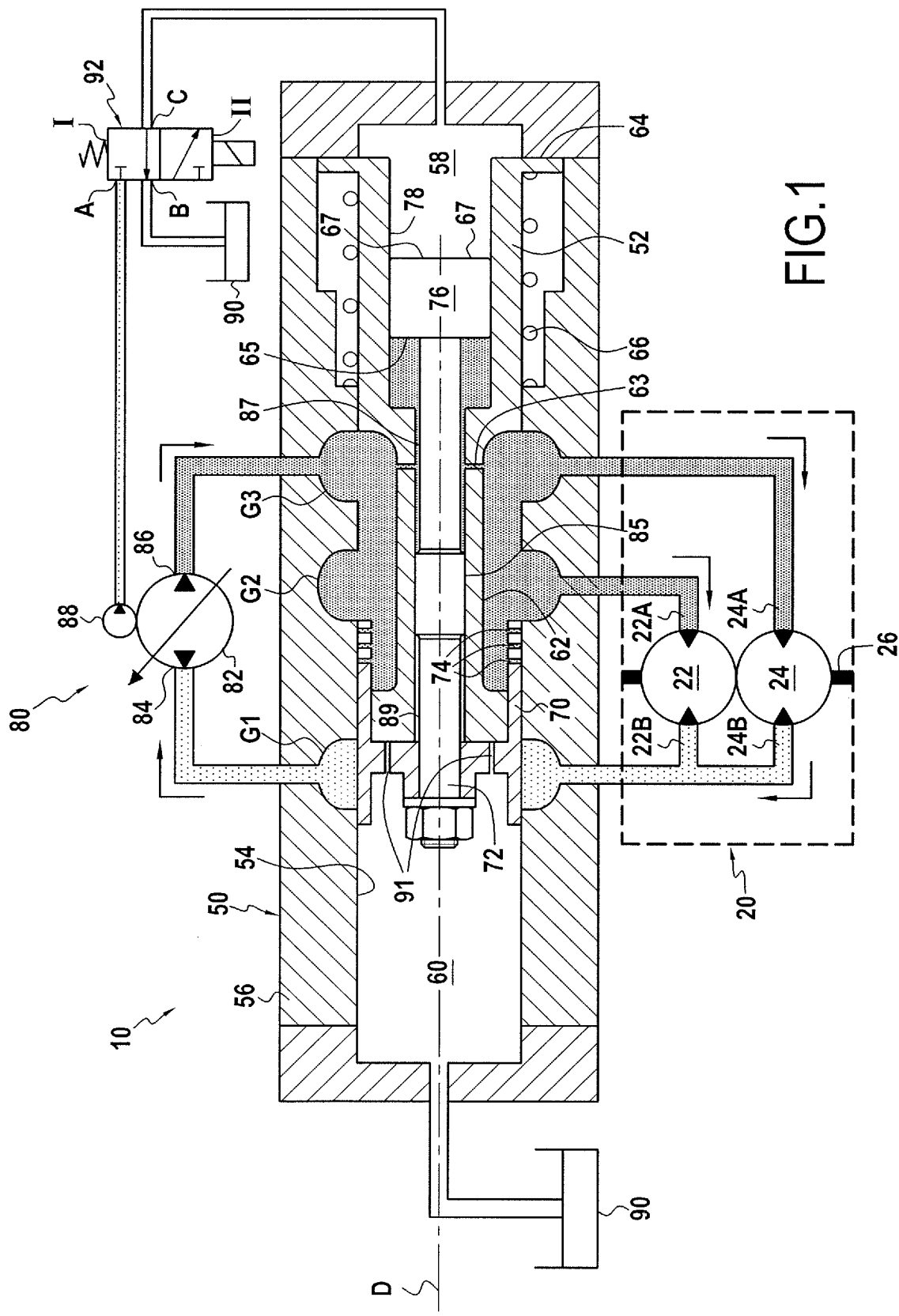
FIG. 1 is a diagrammatic view of a first embodiment of hydrostatic transmission apparatus of the invention, configured in a first displacement, for forward travel.

This apparatus 10 includes:
- a hydraulic motor 20, comprising a first elementary motor 22 and a second elementary motor 24, both of which are coupled to a common outlet shaft 26;
- a displacement selector 50 comprising a moving part or slide 52 suitable for sliding in a bore 54 in a body 56 of the selector;
- a pump 80 comprising a main pump 82 having two main orifices 84 and 86 and a booster pump 88 paired with the main pump;
- a pressure-free reservoir 90, i.e. a reservoir that is substantially at atmospheric pressure; and
- an activation valve 92.

The position taken up by the displacement selector 50 determines the operating mode of the apparatus.

Inside the body 56 of the selector, the slide 52 is mounted to move between two chambers situated at the ends of the bore: namely a control chamber 58 and a "low-pressure chamber" 60 in which low pressure prevails, said low-pressure chamber 60 being connected to the pressure-free reservoir 90.

The control chamber 58 is connected to a port C of the activation valve 92. The valve 92 is a solenoid valve having a slide mounted to move between a first position I and a second position II. A spring urges the valve 92 to stay in the first position.

The valve 92 also has two other ports A and B connected respectively to the delivery orifice of the booster pump 88, and to the pressure-free reservoir 90.

In the first position I, the ports B and C are interconnected and the port A is isolated, thereby making it possible to connect the chamber 58 to the reservoir 90.

In the second position II, the ports A and C are interconnected and the port B is isolated, thereby making it possible to connect the chamber 58 to the booster pump.

Thus, the activation valve makes it possible to control the pressure inside the control chamber 58.

The slide 52 is in the general shape of a cylindrical bar, of outside diameter substantially equal to the inside diameter of the bore 54. Its cylindrical outside surface is provided with a circumferential groove 62 of width extending over some length along the axis D of the bore 54 and of the slide 52.

The bore 54 is provided with three circumferential grooves G1, G2, and G3 that are disjoint in pairs and that are spaced apart along the axis D.

The slide 52 may be placed in a first position (FIG. 1), in which the groove 62 interconnects the grooves G2 and G3 in the bore; or in a second position (FIGS. 2 and 3), in which the groove 62 makes it possible to interconnect the grooves G1 and G2.

The first groove G1 is connected to the first orifice 84 of the pump 82, and the third groove G3 is connected to the second orifice 86. The slide 52 is also provided with a shoulder 64. Return means, namely a spring 66, urge the slide 52 to stay in and/or to return to its first position shown in FIG. 1.

Conversely, the slide 52 is driven towards its second position by the pressure prevailing in the control chamber 58 and being exerted on the slide, directly or indirectly.

As a function of the position of the activation valve 92, the pressure in the control chamber 58 is either zero (pressure of the pressure-free reservoir 90, i.e. atmospheric pressure), or equal to the boost pressure, i.e. to the pressure at the delivery orifice of the booster pump 88. When the pressure inside the chamber 58 is atmospheric pressure, the slide 52 takes up its first position; when said pressure inside said chamber is equal to said boost pressure, said slide takes up its "activated" second position.

By means of arrows along the main ducts of the apparatus 10, FIG. 1 shows the direction in which the fluid flows in the operating mode that is shown. This operating mode is a normal operating mode of the circuit, in which the two elementary motors 22 and 24 are active simultaneously. This mode is referred to as the "high displacement" mode. An operating mode is said to be "normal" when the motor is acting to deliver drive (and not as a brake, in particular).

Each of the elementary motors 22 and 24 has a respective feed enclosure 22A, 24A via which it receives fluid, and a respective discharge enclosure 22B, 24B via which it discharges fluid.

Both of the discharge enclosures 22B and 24B are formed in part by the first groove G1;

The feed enclosure 22A of the first motor 22 is formed in part by the second groove G2; the feed enclosure 24A of the second motor 24 is formed in part by the third groove G3.

In the preceding phrases, the term "in part" is used to emphasize the fact that the corresponding one of the above-mentioned enclosures comprises not only the groove indicated, but also, in particular, facing surfaces, which can depend on the configuration taken up by the selector 50. For example, these facing surfaces may be constituted by a portion of the outside circumferential surface of the slide 52.

In the operating mode shown in FIG. 1, the motors 22 and 24 deliver drive torque via the outlet shaft 26 to which they are coupled. This drive torque is applied to a movement member (a wheel) for moving the vehicle (not shown) on which the apparatus 10 is mounted. A relatively high pressure referred to as the "high pressure of the pump" prevails inside the feed enclosures 22A, 24A of the motors, while a relatively low pressure prevails in the discharge enclosures 22B, 24B.

Figure 2:
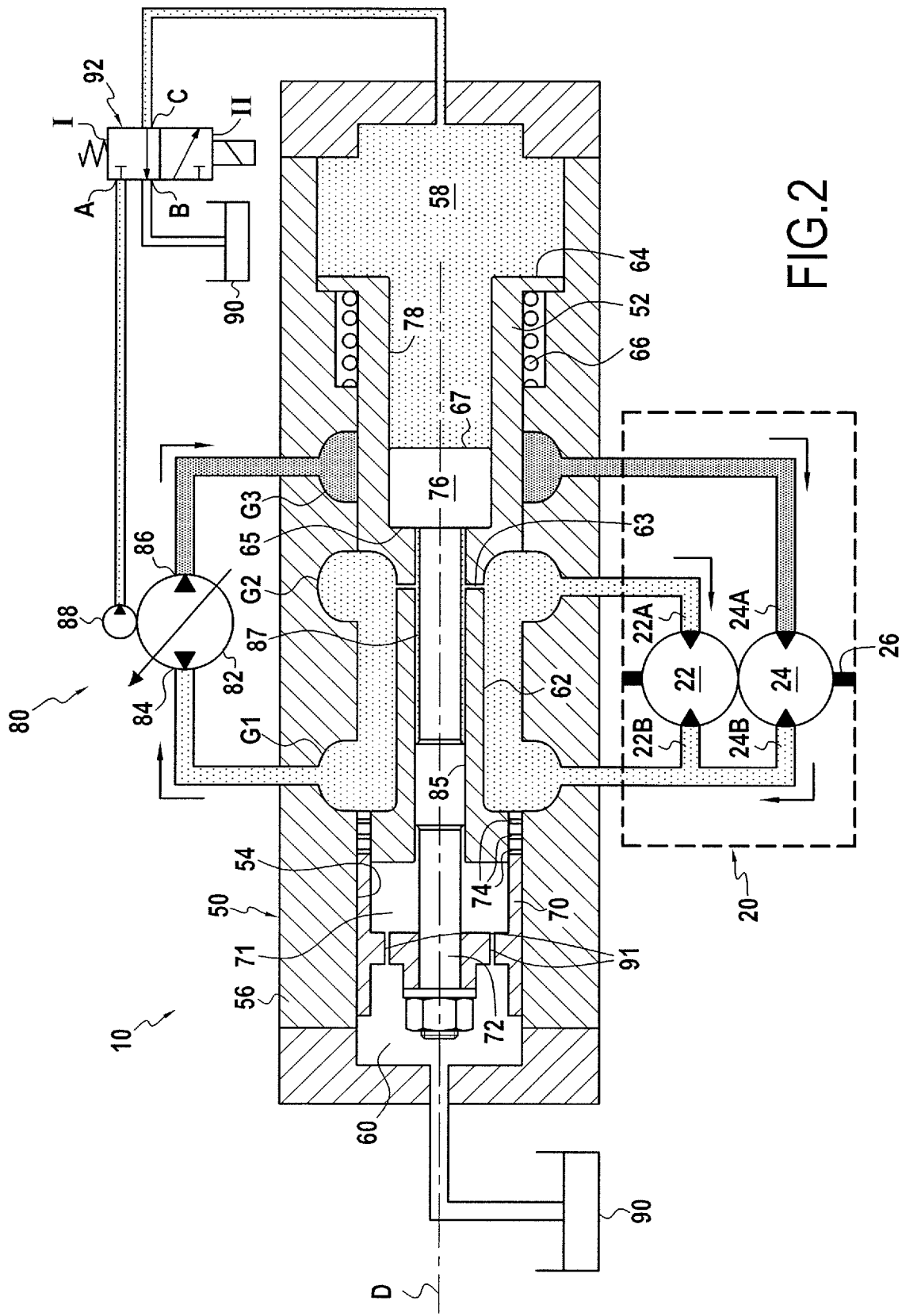
FIG. 2 is a diagrammatic view of the apparatus of FIG. 1, configured in a second displacement, for normal forward travel.
Figure 3:
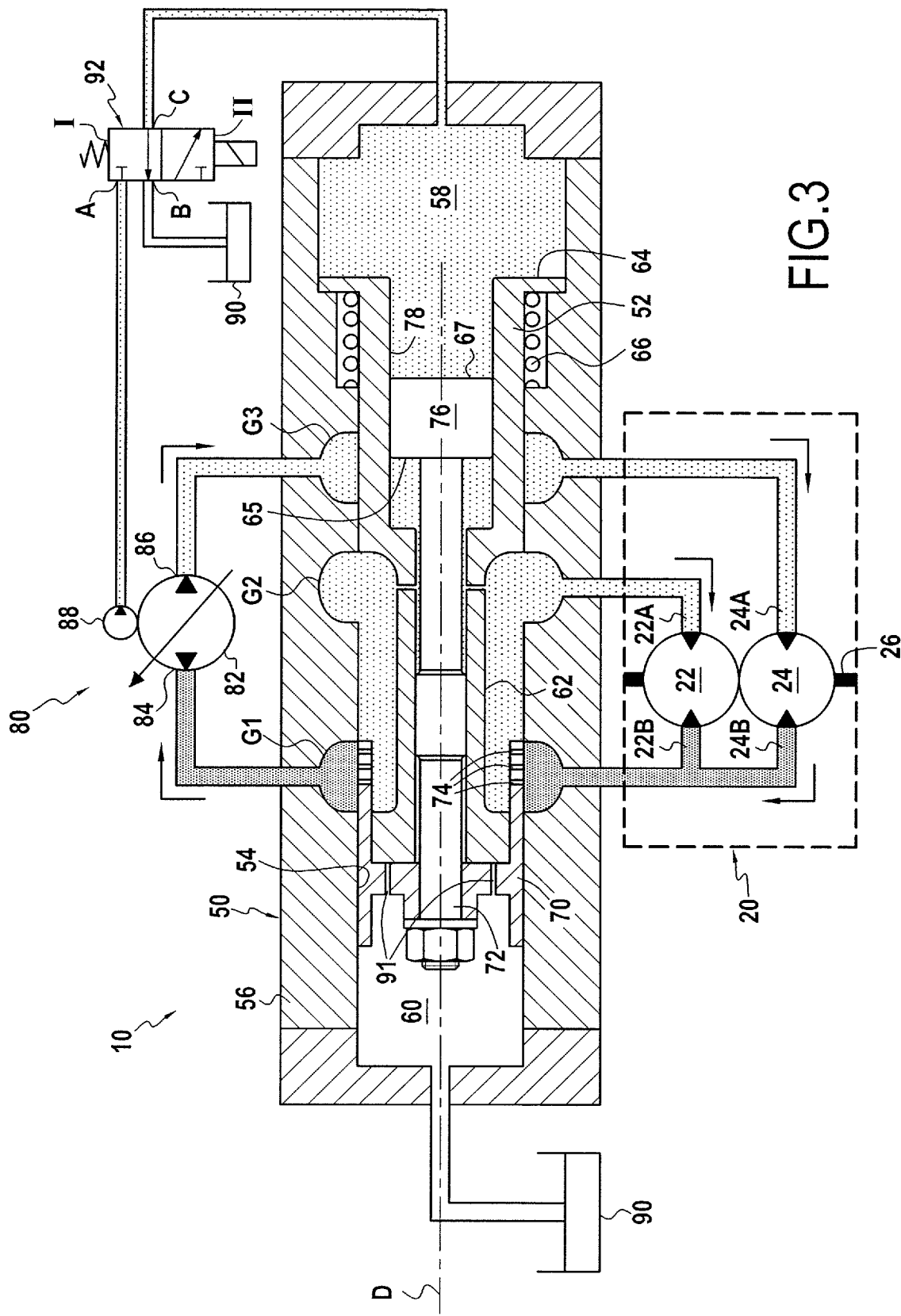
FIG. 3 is a diagrammatic view of the apparatus of FIG. 1, configured in a second displacement, for forward travel, but in a braking situation.
Figure 4:
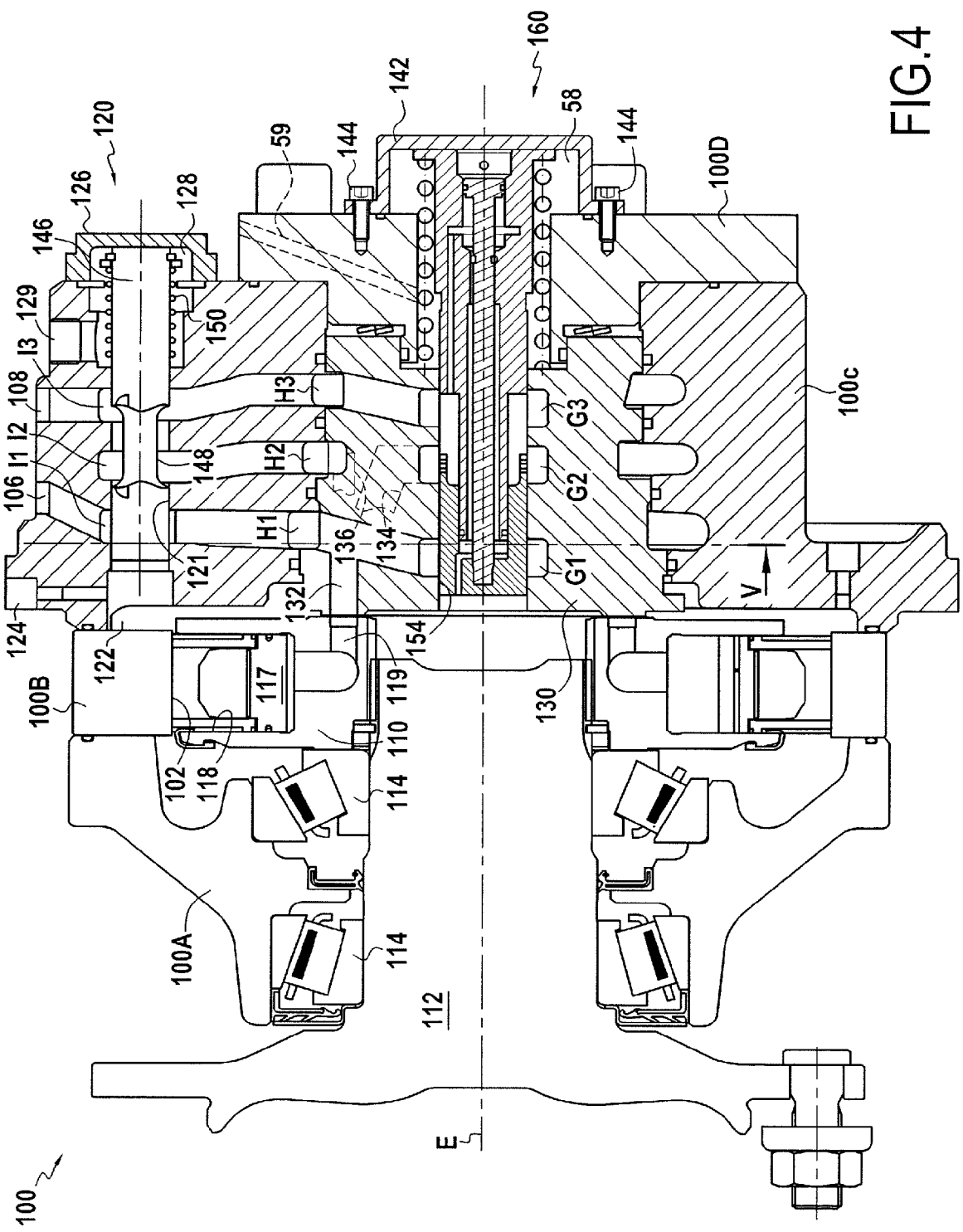
FIG. 4 is a longitudinal section view of a second embodiment of hydrostatic transmission apparatus of the invention.
Figure 5:
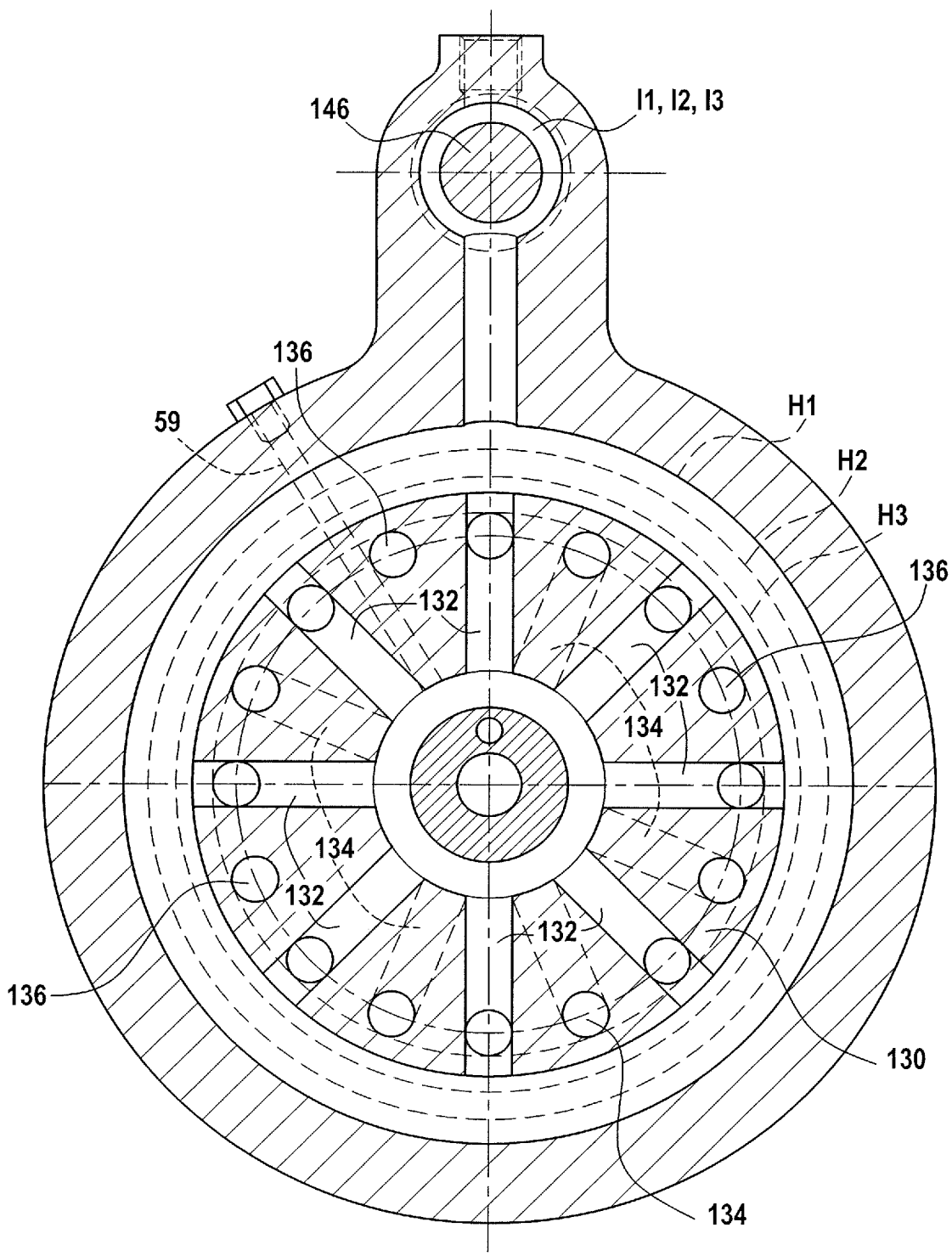
FIG. 5 is a cross-section view of the apparatus of FIG. 4.
Figure 6:
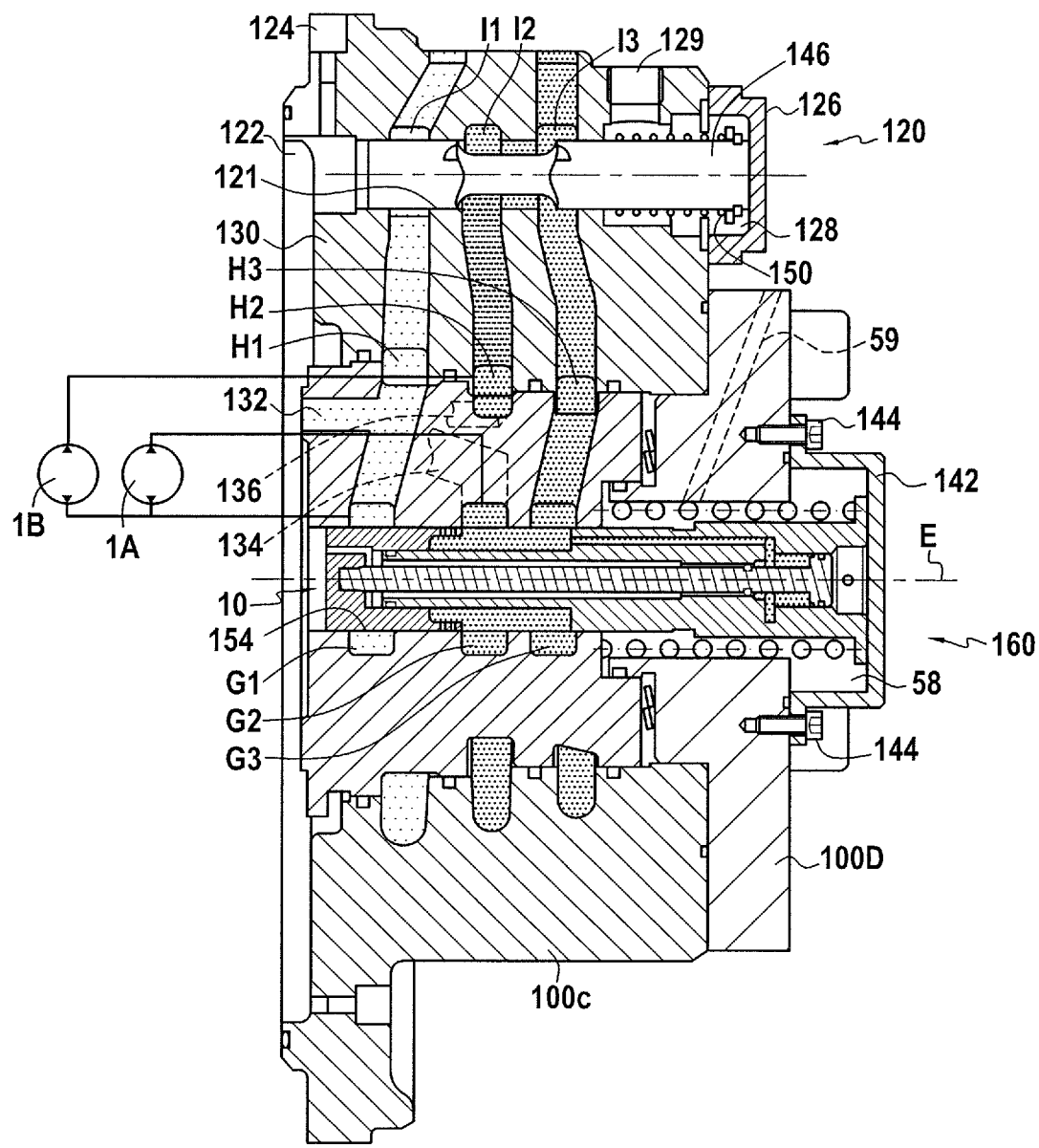
FIG. 6 is a fragmentary longitudinal section view of the apparatus of FIG. 4, in a first displacement.
Figure 7:
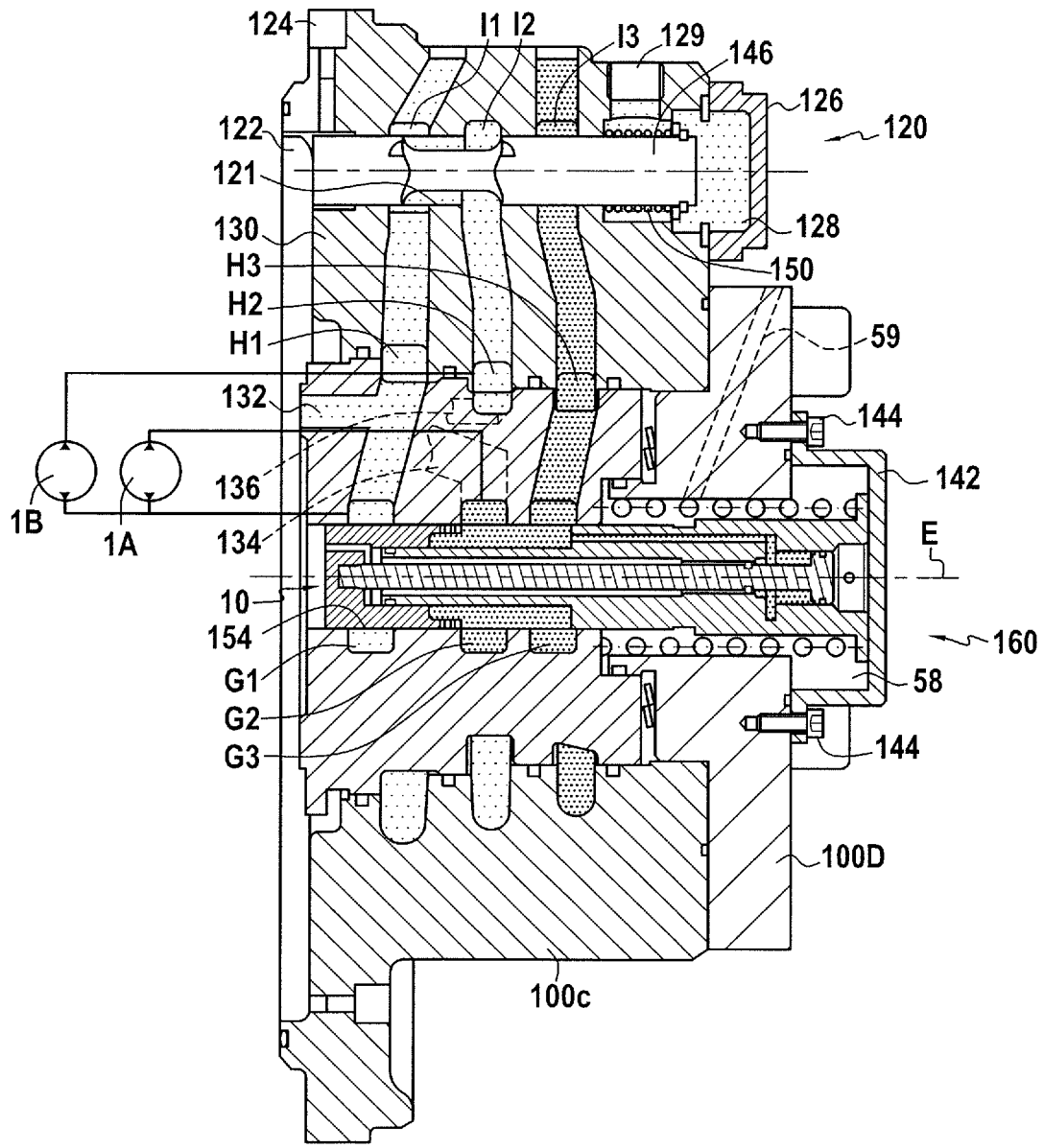
FIG. 7 is a fragmentary longitudinal section view of the apparatus of FIG. 4, in a second displacement.
Figure 8:
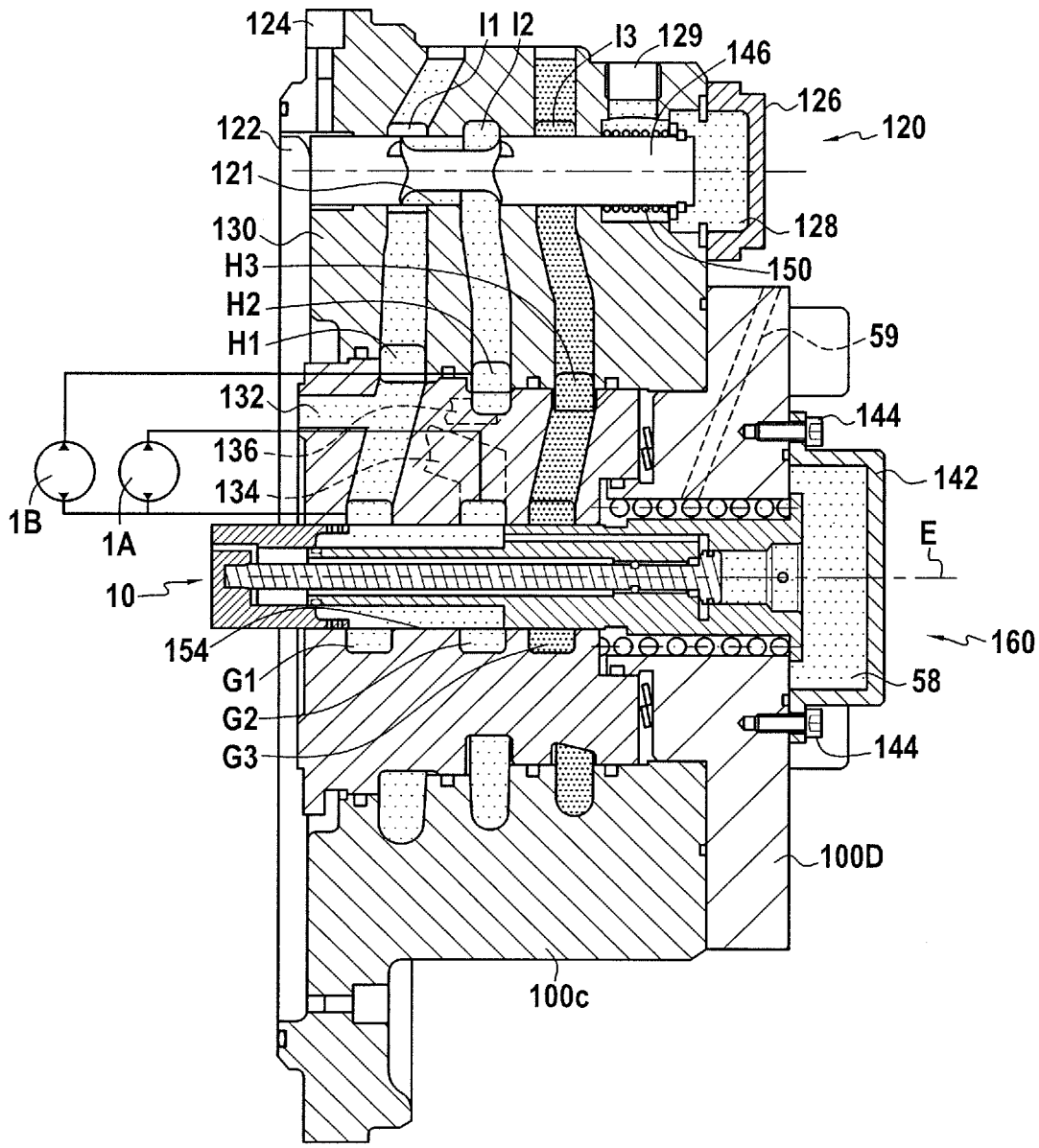
FIG. 8 is a fragmentary longitudinal section view of the apparatus of FIG. 4, in a bypass configuration.
Figure 9:
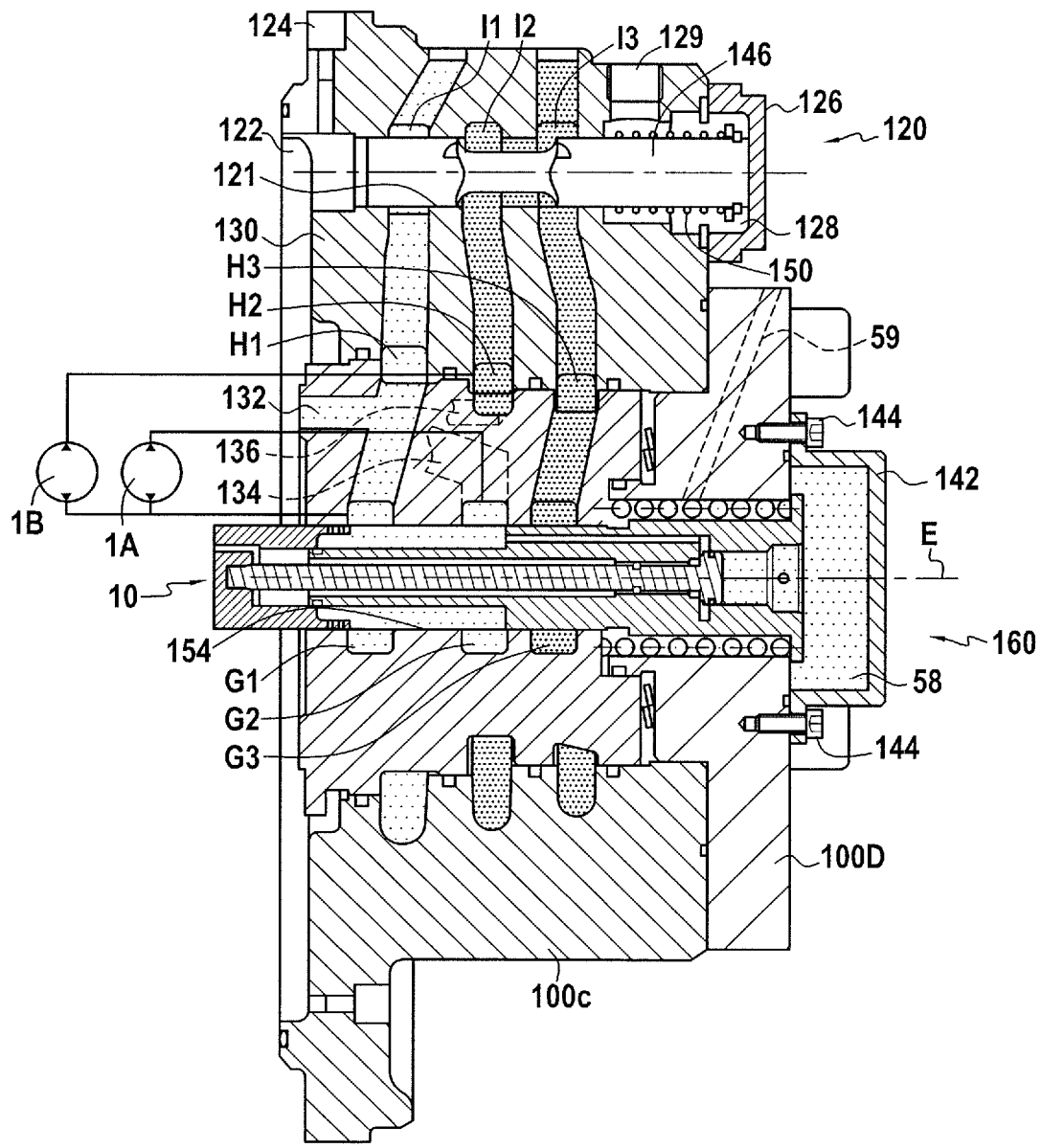
FIG. 9 is a fragmentary longitudinal section view of the apparatus of FIG. 4, in a third displacement for normal forward travel.
Figure 10:
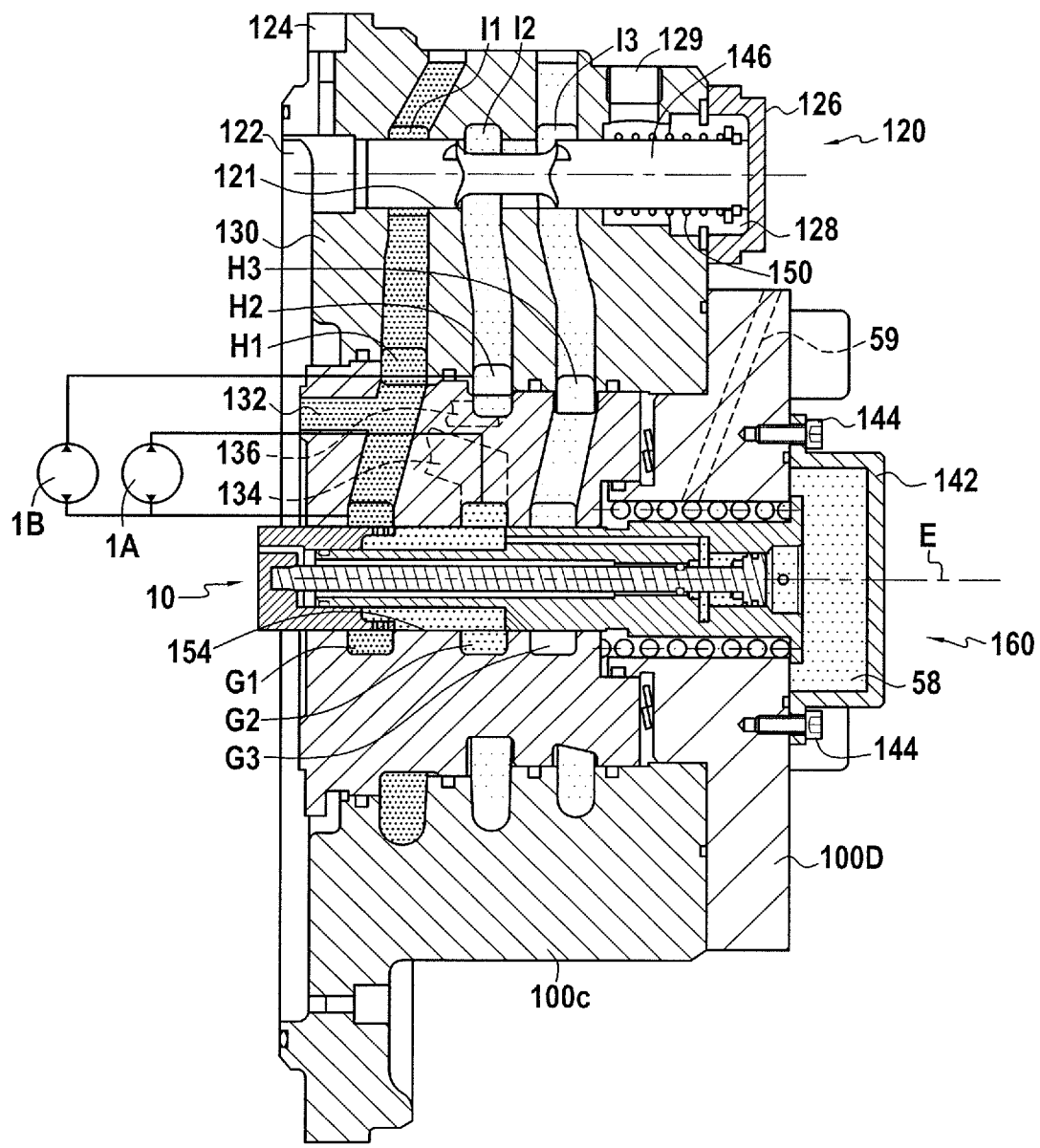
FIG. 10 is a fragmentary section view of the apparatus of FIG. 4, in a third displacement, for normal forward travel but in a braking situation.

FIGS. 2 and 3 show a second operating mode of the apparatus 10. This second operating mode is characterized by the fact that the motor 22 is bypassed and is thus deactivated, only the motor 24 remaining active and delivering drive torque. This mode is thus referred to as the "low displacement" mode.

In order to go over to this operating mode, starting from the high displacement mode (FIG. 1), it suffices to cause the valve 92 to go from position I to position II, thereby actuating the displacement selector 50.

This action causes the pressure inside the control chamber 58 to go from "zero pressure" (atmospheric pressure) to the boost pressure. The boost pressure that is exerted on the shoulder 64 of the slide 52 (in particular) applies a force to the slide 51 that is greater than the return forces exerted by the spring 66. Thus, the slide 52 goes into the second position, as shown in FIGS. 2 and 3.

In this operating mode, the direction of flow of the fluid is identical to the direction of fluid flow in the high displacement mode.

FIG. 2 shows normal operation of the apparatus, i.e. when the motor (in this situation, only the elementary motor 24) delivers drive torque.

In this state, the high pressure of the pump is applied only to the feed enclosure 24A of the second elementary motor 24. The feed enclosure 22A of the first elementary motor and the two discharge enclosures 22B and 24B are brought to the low pressure of the pump 82, which pressure prevails at the inlet orifice 84 of said pump.

In particular, the two enclosures 22A and 22B of the motor 22 are put into communication with each other, between the first groove G1 and the second groove G2, via the groove 62 in the slide 52. A bypass link is thus constituted by the groove 62 between the two enclosures 22A and 22B. In normal operation (FIG. 2), this link does not cause any constriction to be formed, and the fluid can flow freely between the enclosures.

FIG. 3 shows operation of the apparatus while said apparatus is being used for hydrostatic braking.

Such braking takes place starting from the vehicle being in a normal forward travel situation such as the situation shown in FIG. 2. For whatever reason, the driver of the vehicle on which the apparatus 10 is mounted wants to brake said vehicle.

The first action consists in reducing the flow rate of the main pump 84. Given the inertia of the vehicle, the speed of said vehicle varies relatively slowly. Therefore, reducing the flow rate of the pump immediately causes a reduction in pressure at the delivery orifice 86 of the pump and a large increase in pressure at its inlet orifice 84.

This pressure difference being applied between the feed and discharge enclosures of the second motor 24 causes said second motor to deliver braking torque.

In addition, for the purpose of also enabling the first elementary motor to deliver braking torque, constriction means are disposed inside the bore 54.

These means essentially comprise a bushing 70 and a pull-rod 72, both of which are arranged coaxially about the axis D. The bushing is in the general shape of a sleeve, of outside diameter substantially equal to the inside diameter of the bore 54, and said bushing has an outside surface that is concentric with the surfaces of the pull-rod 72 and of the bore 54 of the slide 52.

The end of the bushing 70 that is disposed on the same side as the control chamber 58 has radial passages 74 suitable for enabling the fluid to flow between the outside of the bushing and the space 71 inside it. The end of the slide 52 that is in on the same side as the low-pressure chamber slides through said space, and, in particular, a portion of the groove 62 is situated therein when the selector is in the activated position, i.e. when the slide 52 is in its second position.

The radial passages 74 are formed only in the end of the bushing that is on the same side as the control chamber 58.

The bushing 70 can be positioned in various positions:

A first position is shown in FIG. 1. The bushing is positioned in register with the groove G1, but in such a manner that none of the passages 74 are positioned in register therewith. The bushing 70 then prevents any fluid from flowing between the groove 62 in the slide 52 and the groove G1, and thus from flowing between said groove 62 and the discharge enclosures 22B and 24B of the motors 22 and 24.

The bushing can also be moved along the axis D so as to take up various axially different positions in which one or more passages 74 are situated in register with the groove G1 (FIG. 3). As a function of the number of passages 74 placed in register with said groove, the bushing 70 constricts to a greater or lesser extent the passage between the first groove G1 and the second groove G2 via the groove 62 (bypass link).

In particular, in a position in which it has moved to a maximum extent towards the low-pressure chamber 60, the bushing is completely separated from the groove 62, and thus enables fluid to flow freely through the groove 62, from the first to the second groove (FIG. 2).

The position of the bushing 70 is controlled by a balancing portion 76 in the shape of a piston that is part of the pull-rod 72. The bushing 70 and the balancing portion 76 are fastened to each other at the ends of the pull-rod 72, and more precisely on either side of the central portion of the pull-rod. This central portion of the pull-rod is of substantially cylindrical outside shape, and it extends inside an internal axial passage 78 in the slide 52.

The diameter of the central portion of the pull-rod 72 is strictly smaller than the diameter of the passage 78. In addition, the central portion is provided with a central shoulder 85 that is mounted to slide in substantially leaktight manner inside the passage 78. This shoulder 85 thus subdivides the space inside the passage 78 into two portions:

a chamber 87 is formed between the central shoulder 85 and the balancing portion 76 (which itself also slides in substantially leaktight manner in the bore 78); and a chamber 89 is formed between the central shoulder 85 and the bushing 70.

Radial holes 63 are provided in the groove 62 for connecting said groove to the chamber 87. Thus, the pressure prevailing in the groove 62 is exerted inside the chamber 87. It is thus exerted in particular on the face 65 of the balancing portion 76 that is situated on the same side of the portion 76 as the bushing.

On the side opposite from the face 65, the balancing portion 76 has a face 67 that faces the control chamber 58.

Thus, the balancing portion 76 is subjected to the opposing forces of the control pressure (in the chamber 58), acting on the face 67, and of the pressure in the groove 62 being exerted on the face 65.

When this pressure inside the groove 62 increases, this causes an increase in the force being applied on the balancing portion 76 and tends to move said balancing portion towards the control chamber 58 (rightwards in FIG. 3); this thus tends to move the bushing 70 in the same direction, thereby tending to increase the constriction in the bypass link by reducing the number of passages 74 putting the groove G1 into communication with the groove 62.

In addition, in order to enable the slide 52 to move independently relative to the bushing 70, passages 91 are provided between the low-pressure chamber 60 and the internal space 71 of the bushing 70, which space is itself connected to the chamber 89.

Finally, it should be noted that the bushing 70 and the pull-rod 72 may constitute a single part, with them being formed integrally with each other.

The displacement selector 50 operates as follows.

When the activation valve 92 is placed in position I, the pressure inside the chamber 58 is atmospheric pressure. Under the effect of the spring 66, the slide 52 moves into the first position, towards the chamber 58. Thus, the grooves G2 and G3 communicate with each other and are connected to the orifice 86 of the pump.

In addition, the balancing portion 76 is subjected to a low control pressure (atmospheric pressure) opposing a high pressure (delivery pressure of the pump 82) being exerted respectively on its faces 67 and 65. The balancing portion 76 thus moves towards the control chamber and, therefore, the bushing 70 is positioned in such a manner as to isolate the groove G1, and in particular in such a manner as to isolate it from the grooves G2 and G3.

Thus, the two motors 22 and 24 are active.

When the activation valve 92 is placed in position II, the slide 52 is positioned in the second position by moving away from the control chamber 58, in which position it isolates the groove G3.

When the slide 52 is in this position, the behavior of the bushing 70, driven by the pull-rod 72, depends on the discharge pressure of the first motor 22, i.e. on the pressure in the groove G1.

Below a certain value referred to as the "constriction threshold", the pressure being exerted on the face 65 of balancing portion 76, which pressure is the pressure inside the discharge enclosure of the first motor 22, is not sufficient to overcome the force generated by the control pressure being exerted on the face 67. The bushing 70 thus remains in the first position (leftward, as in FIG. 2), and the bypass link remains free and not constricted.

Conversely, above the constriction threshold, the bushing 70 moves, pulled by the balancing portion 76 via the pull-rod 72 towards the balancing chamber 58.

The arrangement of the balancing portion 76, of the slide 52, of the bushing 70, and of the body 56, makes it possible for regulation to take place and to maintain a balance pressure inside the groove G2 and thus inside the feed enclosure 22A of the first motor.

This pressure is mainly a function of the respective areas on which the feed and control pressures apply, in particular on either side of the balancing portion 76.

In the example shown, it is proportional to the control pressure, the coefficient of proportionality being substantially equal to the ratio of the wetted areas (65 and 67) of the balancing portion.

Preferably, the balancing pressure is sufficient to avoid any cavitation in the motors 22 and 24.

FIGS. 4 to 10 show a second embodiment of apparatus of the invention.

For reasons of simplicity, the same references are kept for the parts or elements that are substantially identical in shape or function to the parts or elements of the first embodiment of the invention.

The hydrostatic transmission apparatus 100 is constituted essentially by a motor 100 that has a casing in four portions 100A, 100B, 100C, and 100D, inside which casing a cylinder block 110 is mounted to rotate, which cylinder block is suitable for driving a shaft 112 in rotation, which shaft is supported relative to the portion 100A of the casing by bearings 114. The casing portions 100A, 100B, and 100C are fastened together by screws (not shown).

The motor 100 also has an internal distributor 130 mounted to be stationary inside the casing portion 100C.

Cylinders 118 that slidably receive pistons 117 are formed in the cylinder block 110. The pistons 117 bear against the undulating cam 102 formed on the inside periphery of the portion 100B of the casing. Although the type of motor shown has a stationary casing and a rotary shaft, the invention also applies to motors having rotary casings.

Cylinder ducts 119 pass through the cylinder block 110, and they are suitable for connecting the cylinders 117 to distribution ducts 132, 134, and 136 that open into the distributor 130.

The casing 100C contains the fluid distribution portion of the motor 100. For this purpose, it has two external connectors 106 and 108 suitable for being connected to the main orifices of a pump.

It also has a first displacement selector 120, disposed in a bore 121 in the casing portion 100C. A first end of the bore is open to the internal chamber 122 in which the cylinder block is disposed; and it is also connected via an external connector 124 to a pressure-free reservoir (not shown).

The second end of the bore 121 containing the selector 120 opens out in an outside face of the casing portion 100C opposite from the casing portion 100B, and is closed by a cap 126.

This second end forms a hydraulic control chamber 128, connected to the outside of the motor via an external connector 129. The bore 121 has three grooves I1, I2, and I3. The grooves I1 and I3 are connected to respective ones of the connectors 106 and 108.

A slide 146 of substantially cylindrical outside shape is mounted in the bore 121.

The slide 146 is provided with a circumferential groove 148. The slide 146 is mounted to move between two positions under the effects of the pressure in the control chamber 128, and of the opposing force exerted by a spring 150 disposed in said control chamber. In an "activated" first position that it takes up when sufficient pressure prevails inside the chamber 128, the slide 146 interconnects the grooves I1 and I2; in a second position that it takes up when lower pressure prevails inside the chamber 128, it interconnects the grooves I2 and I3.

The casing 100C also contains a second displacement selector 160 disposed on the axis of rotation E of the motor inside a bore 154 in the distributor 130. The internal structure of said selector 160 and operation thereof are identical to the inside structure and operation of the selector presented with reference to FIGS. 1 to 3; therefore only the elements that are specific to the selector 160 are described below.

The distributor 130 has three circumferential grooves G1, G2, and G3 formed in its internal bore 154. It also has three external circumferential grooves H1, H2, and H3. Links provided in the casing portion 100C respectively connect the groove I1 to the groove H1, the groove I2 to the groove H2, and the groove I3 to the groove H3.

Links provided in the distributor 130 connect the groove H1 to the groove G1, and the groove H3 to the groove G3.

The various distribution ducts 132, 134, and 136 are connected to respective ones of the grooves G1, G2, and H2. In the distributor 130, the distribution ducts are arranged about the axis of rotation E in the following manner: Five ducts 134 are connected to the groove G2 and they form therewith the feed enclosure of a first elementary motor 1A of the motor 100; three ducts 136 are connected to the groove H2, and they form therewith the feed enclosure of a second elementary motor 1B. Finally, the ducts 132 together with the groove G1 constitute the single discharge enclosure common to the elementary motors 1A and 1B.

The selector 160 is arranged in a body made up of three portions, namely the distributor 130, the casing portion 100D, and a cover 142, which is fastened to the casing portion 100D by screws 144.

The selector 160 has a control chamber 58 situated in the bore 154 in the casing portion 100D. The chamber 58 is closed at its two ends: at the end closer to the motor, said chamber is closed by surfaces of the distributor 130, and of the slide 52, and by a face 67 of the balancing piston 76 of the pull-rod 72; and at the other end, said chamber is closed by the cover 142. It can thus be observed that the pressure in the chamber 58 makes it possible to act both on the slide 52, and on the pull-rod 72 via its balancing piston 76.

The control chamber 58 communicates with the end of the motor via a link duct 59, thereby making it possible to control the pressure inside the chamber.

It is assumed below that the motor 100 is connected respectively to the delivery orifice of a main pump via its connector 106 (and thus subjected to a high pressure under normal conditions) and to the inlet orifice of said pump via its connector 108 (and thus subjected to a low pressure under normal conditions).

The main operating modes of the motor 100 are as follows under normal conditions:

In a first mode (FIG. 6) corresponding to a first displacement, low pressure is applied in the chambers 128 and 58.

Therefore, the slides 146 and 52 move rightwards under the effect of the springs 150 and 66 respectively (the directions are given with reference to FIGS. 6 to 10). In the selector 120, the grooves I2 and I3 are put into communication with each other; in the selector 160, the grooves G1 and G3 are put into communication with each other.

In the motor 100, the two motors 1A and 1B are thus subjected to high pressure in their feed enclosures, and to low pressure in their discharge enclosures, and thus both of them are active and both of them deliver drive torque in this operating mode.

In a second operating mode (FIG. 7), a high pressure is applied in the chamber 128, and a low pressure is applied in the chamber 58.

It can be understood that, in particular as a function of the springs 150 and 66, the above-indicated high and low pressures are chosen in such a manner as to put the selectors 120 and 160 respectively in the activated position or in the non-activated position.

In this operating mode, the slide 146 of the selector 120 is positioned on the left, and the grooves I1 and I2 are put into communication with each other. The selector 160 puts the grooves G2 and G3 into communication with each other.

Thus, the motor 1A is active and is delivering drive torque, whereas the motor 1B is bypassed, its feed enclosure (groove H2) being, like its discharge enclosure (groove G1) brought to the low pressure.

In a third operating mode (FIG. 8), a high pressure is applied in both of the chambers 128 and 58. The slide 146 is positioned on the left in the selector 120. The grooves I1 and I2 are put into communication with each other. The selector 160 puts the grooves G1 and G2 into communication with each other.

In this mode, both of the motors 1A and 1B are bypassed, their feed enclosures (grooves G2 and H2) being put into communication with their common discharge enclosure (groove G1).

In a fourth operating mode (FIG. 9), a low pressure is applied in the chamber 128, and a high pressure is applied in the chamber 58. Thus, the slide 146 is positioned on the right in the selector 120. The grooves I2 and I3 are put into communication with each other. The selector 160 puts the grooves G1 and G2 into communication with each other.

In this mode, the motor 1B is active, while the motor 1A is bypassed. Since the motors 1A and 1B have different cylinder capacities, this fourth operating mode makes it possible to operate the motor with a displacement different from the displacement implemented in the second operating mode.

Whereas the four preceding operating modes correspond to normal operation of the motor, a specific operating mode is described below (FIG. 10): this corresponds to operation of the motor during a braking stage, and more particularly, during braking performed while the motor is being operated in its fourth operating mode.

When such braking is performed, the pressures in the motor 100 change considerably.

Firstly, the pressures at the orifices of the pump are inverted. Thus, a high pressure is applied in the connector 108, and a low pressure is applied in the connector 106.

Due to this inversion, which is applied in its feed and discharge enclosures, the second elementary motor 1B becomes a brake and delivers braking torque to the outlet shaft 12.

The behavior of the first elementary motor 1A depends on the control pressure applied in the chamber 58.

If the pressure in the discharge enclosure (groove G1) exceeds a certain "constriction threshold" pressure, the constriction means constituted by the bushing 70 associated with the pull-rod 72 are activated: they move rightwards, in such manner that the bushing comes to obstruct partially the communication passage between the grooves G1 and G2.

As a result, an intermediate pressure is established in the groove G2, and the elementary motor 1A thus delivers braking torque. Advantageously, the value of the braking torque is constant whenever constant control pressure is applied, because it depends only on the control pressure applied in the chamber 58.

Figure 11:
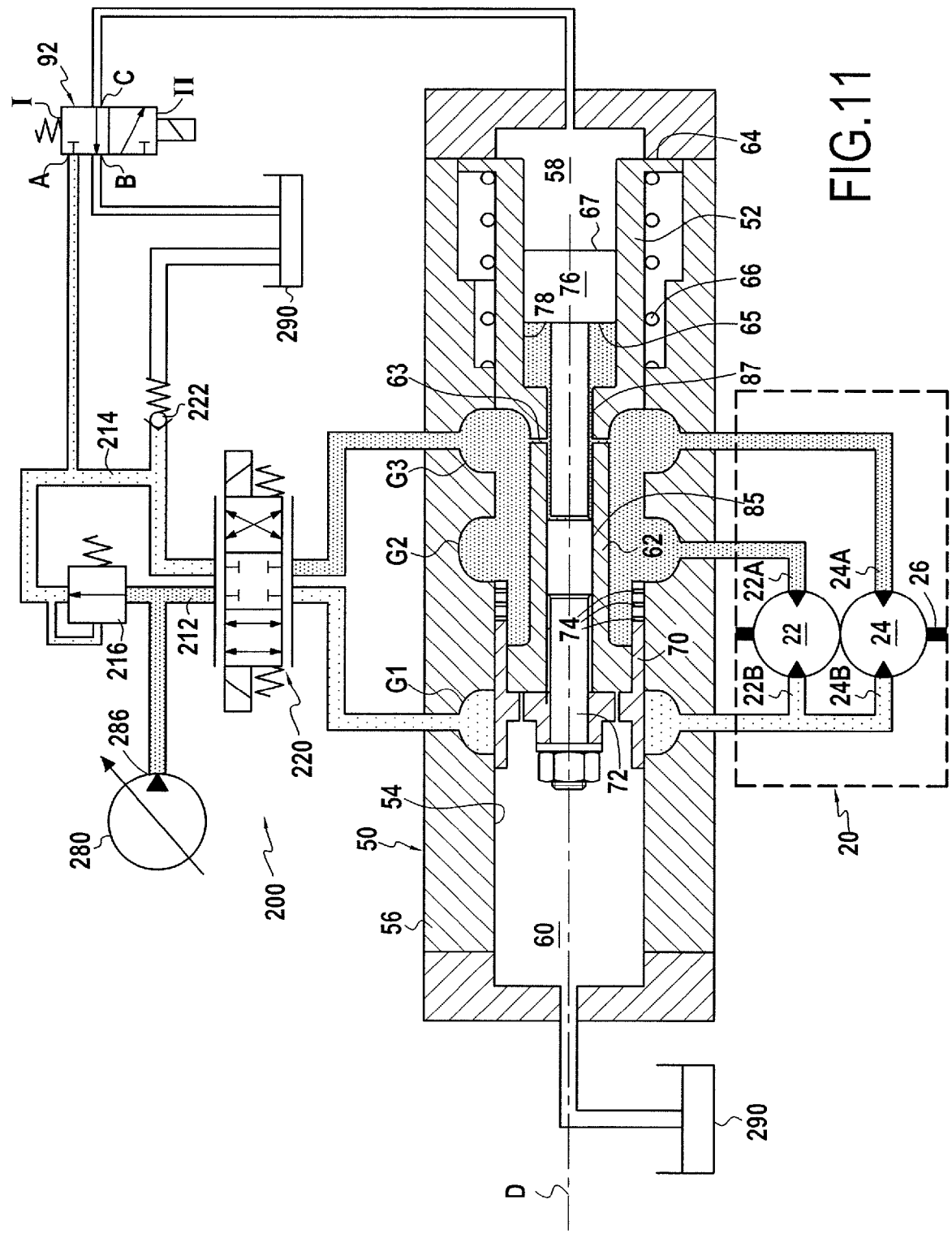
FIG. 11 is a section view of a third embodiment of hydrostatic transmission apparatus of the invention.

FIG. 11 shows a third embodiment of the invention, in which the main pump is operated in open circuit.

Except for the pump and for the fluid distribution circuit between the pump, the selector 50, and the pressure-free reservoir (290), the hydrostatic transmission apparatus 200 shown diagrammatically in FIG. 11 is identical to the apparatus 10 shown in FIG. 1.

The differences are as follows:

The pump 280 is a variable-flow-rate pump that pumps the fluid from a pressure-free reservoir 290 (duct not shown) and delivers it at its delivery orifice 286, into a first duct 212.

A second duct 214 is connected to the first duct 212 via a pressure reducer 216; a relatively low pressure referred to as the "low pressure" is therefore applied in the second duct 214.

The first and second ducts 212 and 214 are suitable for being connected to the first and third grooves of the selector 50 via a reversing valve 220. This valve 220 is a solenoid valve having three positions that can put the first duct into communication with the first groove G1, and that can put the second duct into communication with the third groove G3, or vice versa; in its third position, the various ports of the valve 220 are isolated from one another.

The pressure in the second duct 214 is also limited by means of a link towards the reservoir 290, on which link a rated valve 222 is interposed. The rating of the valve ensures that the "low pressure" remains greater than atmospheric pressure.

Finally, an activation valve 292 is interposed between the second duct 214 to which its port A is connected, and the control chamber 58 to which its port C is connected (its port B being connected to the reservoir 290). The valve 292 is arranged like the valve 92 in the first embodiment.

The apparatus 200 shows an implementation possibility of the invention with a pump and a motor that are connected together via an open circuit.

The invention claimed is:

1. Hydrostatic transmission apparatus comprising at least a first elementary motor fed via a feed enclosure and from which fluid is discharged via a discharge enclosure, and a displacement selector, the displacement selector being suitable for taking up a bypass position, in which said feed enclosure is put into communication with said discharge enclosure via a bypass link, the apparatus further comprising constriction means for constricting said bypass link, and wherein, when the selector is in the bypass position, said constriction means are suitable for being activated to restrict the flow of fluid through the bypass link when a discharge pressure prevailing in the discharge enclosure exceeds a constriction threshold, said threshold being a function of a control pressure prevailing in a control chamber, and said constriction means are suitable for being deactivated to enable fluid to flow substantially freely through the bypass link when the discharge pressure is less than said constriction threshold.

2. Hydrostatic transmission apparatus according to claim 1, wherein, when they are activated, said constriction means are suitable for regulating the feed pressure of the first motor to a balancing pressure that is a function of the control pressure.

3. Hydrostatic transmission apparatus according to claim 1, wherein, when they are activated, the constriction means make it possible to vary a through section of the bypass link, in such a manner that an increase in the feed pressure of the first motor tends to cause a decrease of said through section.

4. Hydrostatic transmission apparatus according to claim 1, further comprising a fluid distributor, the selector being disposed inside the distributor on an axis of rotation of the first elementary motor.

5. Hydrostatic transmission apparatus according to claim 1, wherein the selector includes a moving part having an outside surface that constitutes a wall of the control chamber, the pressure that is exerted on said surface inside the control chamber being suitable for causing the moving part to move, thereby causing the displacement to change.

6. Hydrostatic transmission apparatus according to claim 1, wherein the selector has a body, and the constriction means are disposed in the body of the selector.

7. Hydrostatic transmission apparatus according to claim 1, wherein the selector has a body, and a slide that is disposed in a bore in said body; and, inside said control chamber for controlling the constriction means, the control pressure is applied on the slide, making it possible to cause said slide to go into said bypass position or not to cause said slide to go into said bypass position.

8. Hydrostatic transmission apparatus according to claim 7, further comprising a main pump, and wherein: the body of the selector is provided with at least three grooves;
  the first groove and the second groove respectively form at least part of the discharge enclosure and at least part of the feed enclosure of the first elementary motor;
  the first groove is suitable for being connected to a fluid feed or fluid discharge circuit,
  the second groove is suitable for being connected to the first groove or to the third groove respectively when the slide of the selector is in a first position and when said slide is in a second position, the first position thus constituting the bypass position;
  the third groove is suitable for being connected to a fluid feed or fluid discharge circuit, e.g. to a main orifice of the main pump;
  the constriction means comprise a moving constriction part; and
  in the bypass position;
  when the constriction part is in a first position, the second groove is put into communication with the first groove substantially without any constriction; and
  when the constriction part is in at least one other position, the second groove is put into communication with the first groove and the constriction part constricts a through passage between the first groove and the second groove.

9. Hydrostatic transmission apparatus according to claim 8, further comprising a second elementary motor having a discharge enclosure and a feed enclosure formed respectively, and at least in part, by the first groove and by the third groove.

10. Hydrostatic transmission apparatus according to claim 8, further comprising a second elementary motor having a discharge enclosure formed at least in part by the first groove, and a feed enclosure, which feed enclosure is suitable for being put into communication with a fluid feed or fluid discharge circuit by additional displacement selection means.

11. Hydrostatic transmission apparatus according to claim 9, wherein the two elementary motors are part of the same hydraulic motor and are suitable for driving a common outlet member of said hydraulic motor.

12. Hydrostatic transmission apparatus according to claim 8, wherein:
  when they are activated, said constriction means are suitable for regulating the feed pressure of the first motor to a balancing pressure that is a function of the control pressure and
  the constriction part, is urged in opposite directions by the control pressure and by the feed pressure; moves in a first direction and reduces the section of said through passage when the feed pressure is tending to increase above the balancing pressure; and otherwise moves in a second direction and increases said section of said through passage; whereby said constriction part makes it possible to regulate the feed pressure to the balancing pressure.

13. Hydrostatic transmission apparatus according to claim 8, wherein the constriction part comprises a slidably mounted bushing disposed in the bore, said bushing making it possible, as a function of its position relative to the grooves, to close off in part said through passage between the first and the second groove.

14. Hydrostatic transmission apparatus according to claim 13, wherein the bushing and the slide have concentric surfaces and are disposed on an axis (D) of the bore of the selector.

15. Hydrostatic transmission apparatus according to claim 1, further comprising means for causing the control pressure to vary.

16. Hydrostatic transmission apparatus according to claim 7, wherein when they are activated, said constriction means are suitable for regulating the feed pressure of the first motor to a balancing pressure that is a function of the control pressure.

17. Hydrostatic transmission apparatus according to claim 16, further comprising a main pump, and wherein: the body of the selector is provided with at least three grooves;
the first groove and the second groove respectively form at least part of the discharge enclosure and at least part of the feed enclosure of the first elementary motor;
the first groove is suitable for being connected to a fluid feed or fluid discharge circuit, e.g. to a main orifice of the main pump;
the second groove is suitable for being connected to the first groove or to the third groove respectively when the slide of the selector is in a first position and when said slide is in a second position, the first position thus constituting the bypass position;
the third groove is suitable for being connected to a fluid feed or fluid discharge circuit;
the constriction means comprise a moving constriction part; and
in the bypass position:
when the constriction part is in a first position, the second groove is put into communication with the first groove substantially without any constriction; and
when the constriction part is in at least one other position, the second groove is put into communication with the first groove and the constriction part constricts a through passage between the first groove and the second groove.

18. Hydrostatic transmission apparatus according to claim 2, wherein, when they are activated, said constriction means are suitable for regulating the feed pressure of the first motor to a balancing pressure that is substantially proportional to the control pressure.

19. Hydrostatic transmission apparatus according to claim 12, wherein, when they are activated, said constriction means are suitable for regulating the feed pressure of the first motor to a balancing pressure that is substantially proportional to the control pressure.

20. Hydrostatic transmission apparatus according to claim 16, wherein when they are activated, said constriction means are suitable for regulating the feed pressure of the first motor to a balancing pressure that is substantially proportional to the control pressure.

21. Hydrostatic transmission apparatus according to claim 8, wherein the first groove is suitable for being connected to a main orifice of the main pump.

22. Hydrostatic transmission apparatus according to claim 17, wherein the first groove is suitable for being connected to a main orifice of the main pump.

* * * * *